US011689948B2

(12) United States Patent
Khanka

(10) Patent No.: US 11,689,948 B2
(45) Date of Patent: Jun. 27, 2023

(54) CELL TOWER MONITORING SYSTEMS AND METHODS

(71) Applicant: T-Mobile USA, Inc., Bellevue, WA (US)

(72) Inventor: Bhagwan Singh Khanka, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/652,704

(22) Filed: Feb. 28, 2022

(65) Prior Publication Data

US 2022/0182862 A1    Jun. 9, 2022

Related U.S. Application Data

(63) Continuation of application No. 16/845,467, filed on Apr. 10, 2020, now Pat. No. 11,265,745.

(51) Int. Cl.
*H04W 24/08* (2009.01)
*H04W 76/11* (2018.01)
*H04W 24/04* (2009.01)
*H04W 88/08* (2009.01)

(52) U.S. Cl.
CPC ........... *H04W 24/08* (2013.01); *H04W 24/04* (2013.01); *H04W 76/11* (2018.02); *H04W 88/08* (2013.01)

(58) Field of Classification Search
CPC ..... H04W 24/08; H04W 24/04; H04W 76/11; H04W 88/08; H04W 88/18
See application file for complete search history.

(56) References Cited

U.S. PATENT DOCUMENTS

| 7,196,633 | B2 | 3/2007 | Ardelan, Jr. et al. |
| 9,642,024 | B2 | 5/2017 | Reed et al. |
| 2011/0050245 | A1* | 3/2011 | Sato ...................... G01R 31/11 324/534 |
| 2014/0018007 | A1 | 1/2014 | Ogawa et al. |
| 2014/0043035 | A1 | 2/2014 | Klapper et al. |
| 2015/0358144 | A1 | 12/2015 | Fleischer et al. |
| 2016/0149753 | A1* | 5/2016 | Gerszberg ........... H04L 41/0677 370/242 |
| 2017/0294955 | A1 | 10/2017 | Tomioka |
| 2019/0317123 | A1 | 10/2019 | Woodbridge |
| 2020/0025644 | A1 | 1/2020 | Brinker |

* cited by examiner

*Primary Examiner* — Said M Elnoubi
(74) *Attorney, Agent, or Firm* — Summit Patents PC

(57) ABSTRACT

Faults along a transmission pathway of a cell tower disrupt or prevent the cell tower from connecting user equipment (UE) to a cellular network. A cell tower monitoring and diagnostic system identify faults that occur along the transmission pathway and provide information regarding the faults to a network management center. The cell tower monitoring and diagnostic system can include multiple monitoring devices that are electrically coupled to portions of the transmission pathway. Each of the monitoring devices outputs an inquiry signal along the portion of the transmission pathway and receives a response signal in return. Each of the monitoring devices generates and transmits an output based on the response signal. A base station analyzes or evaluates the outputs from the monitoring devices to identify a fault on the transmission pathway. The base station can also determine the location and type of the fault based on the output.

20 Claims, 5 Drawing Sheets

CELL TOWER MONITORING SYSTEMS AND METHODS

CROSS-REFERENCE TO RELATED APPLICATIONS

This application is a continuation of U.S. patent application Ser. No. 16/845,467, filed Apr. 10, 2020, entitled, "CELL TOWER MONITORING SYSTEMS AND METHODS," which is incorporated herein by reference in its entirety for all purposes.

BACKGROUND

Cell phones, mobile devices, and other user equipment (UE) connect to cell towers to access one or more services of a cellular network, such as voice call services, text messaging services, data services and other services. The UE and cell tower use radio transmissions to exchange communications. At the cell tower, these radio communications are received and transmitted along a transmission pathway of the cell tower to the cellular network. The transmission pathway includes various cables, connectors and equipment that carry the communications to and from UEs through the cell tower. Degradation or faults along this transmission pathway can prevent the cell tower from operating efficiently or even prevent it from communicating with the UE at all. Such failure or degradation can adversely affect the functioning of the cell tower and impact UEs that are served by the cell tower.

To repair the cell tower and restore it to normal operation, a technician can be dispatched to diagnose and repair the failure or degradation. While some failures are obvious or easy to diagnose and correct, other failures may not be so obvious. For the failures that are not obvious to diagnose, the technician may have to go through a process of replacing various parts and equipment of the cell tower in an attempt to figure which part or piece of equipment actually failed or was causing the degradation. Not only does such a process take time, it is also expensive since parts and equipment may be replaced when not needed. Additionally, if the technician does not have the appropriate equipment needed to repair the failure or degradation of the cell tower, the technician may have to return to a service location to obtain the necessary equipment, further delaying repairs.

There exists a need for monitoring and diagnostic systems and methods that can monitor the status of the of a cell tower, identify faults or failures in the cell tower and provide fault information to network management so that the cell tower can be repaired.

DETAILED DESCRIPTION

Cell towers are an important link in the cellular network. The cell tower uses radio communications to allow user equipment (UE) to access the cellular network. Various components and equipment of the cell tower provide the communications capability of the tower. However, failures, degradation and other faults of the components and equipment can adversely affect the operation of the cell tower. The cell tower monitoring and diagnostic systems and methods described herein monitor the components and equipment of the cell tower for faults and identify the location and type of the faults. This information is provided to a management location, system or person of the cellular network so that the faults can be repaired. By identifying a presence of a fault and the location and type of the fault, the repair process to correct the fault is more efficient. A technician can be dispatched to specifically repair the identified fault and can be prepared to repair the fault since they know the location and type of the fault. This allows the technician to gather the necessary equipment, travel to the cell tower and repair or replace the faulty component or equipment. Additionally, some faults can be mitigated by network management by adjusting an operating parameter of the cell site. In this case, a technician does not need to be dispatched and the fault can be mitigated by the network management.

Figure 1:
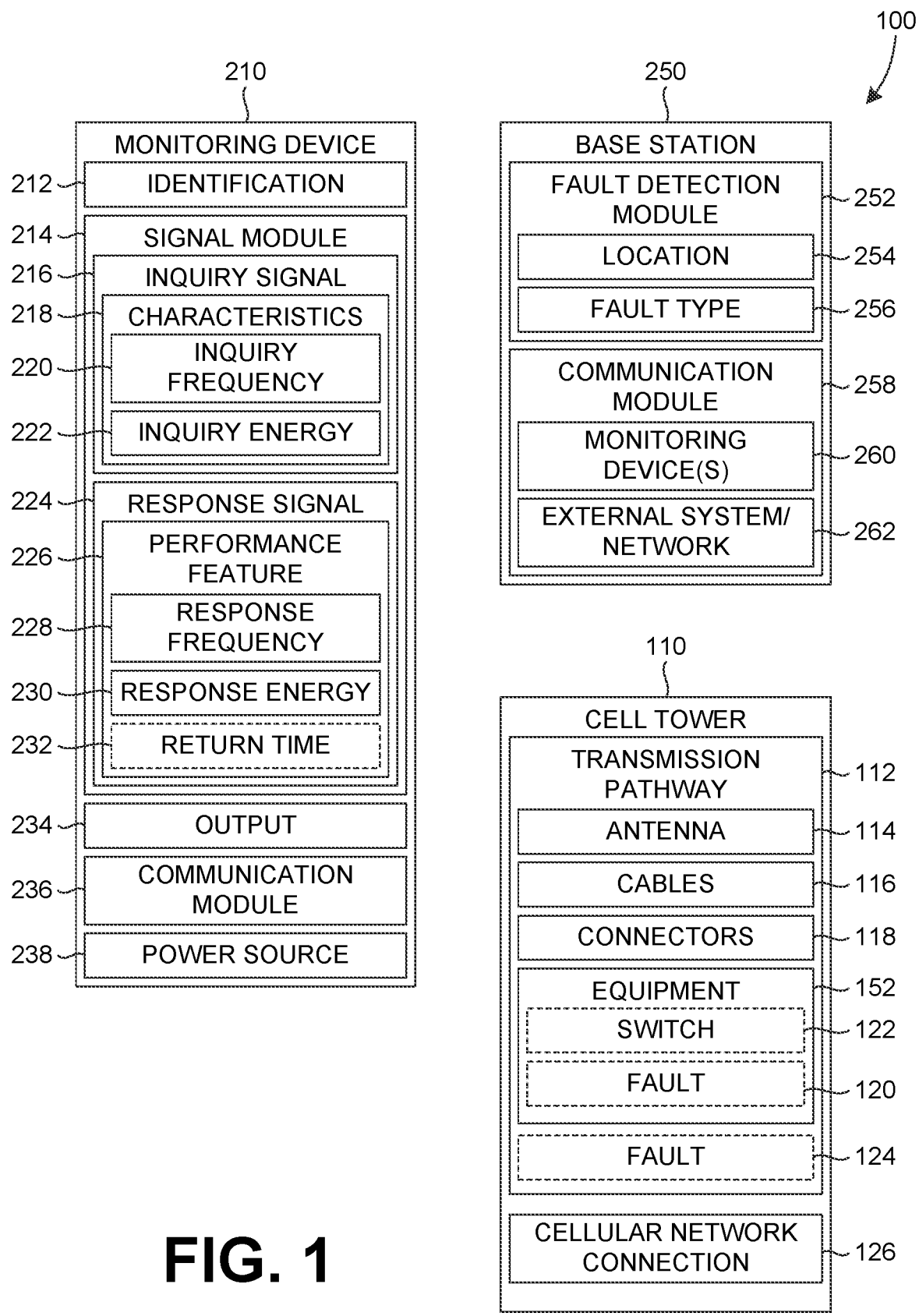
FIG. 1 is a block diagram of an example cell tower monitoring and diagnostic system.

FIG. 1 illustrates an example cell tower monitoring and diagnostic system 100 that includes a cell tower 110, a monitoring device 210, and a base station 250. A UE connects to the cell tower 110 and exchanges radio communications with the cell tower 110. By exchanging communications with the cell tower 110, the UE can access various features of the cellular network of which the cell tower 110 is a part. Radio communications received by the cell tower 110 from the UE are passed along a transmission pathway 112 to the cellular network by a cellular network connection 126. Similarly, radio communication sent from the cellular network to the UE are passed from the cellular network connection 126 along the transmission pathway 112 and broadcasted from the cell tower 110. Faults 124 on the transmission pathway 112 can prevent or hinder the exchange of radio communications between the UE and the cellular network by blocking or degrading a radio communication along the transmission pathway.

The transmission pathway 112 includes various components and equipment that are used to send and receive radio communications with the UE and the cellular network. For example, the radio transmission pathway 112 can include one or more antenna 114, cables 116, connectors 118, and other equipment 120, such as a switch 122. The various equipment and components of the transmission pathway 112 are interconnected to provide the communication between the cellular network and the UE. The antenna 114 of the transmission pathway 112 is used to receive and transmit radio communications with the UE. Cables 116 electrically connect the equipment and components of the transmission pathway 112. Connectors 118 can couple cables 116 together and couple cables 118 to various other equipment and components. The equipment 120 of the transmission pathway 112 can assist with transmitting signals along the transmission pathway 112. Example equipment 120 can include the switch 122 that is used to direct signals along the transmission pathway 112, analog-to-digital conversion equipment, transceivers, and other equipment that assists the cell tower 110 with transmitting signals along the transmission pathway 112.

Any of the various components and equipment of the transmission pathway 112 can fail or degrade, creating a fault 124. Example faults 124 can include breaks in the cables 116, water or foreign materials in the cables 116 or connectors 118, a failure of the antenna 114, or a failure of a piece of equipment 120. Due to a fault 124, signals along the transmission pathway 112 can be blocked or degraded. Blocking of signals along the transmission pathway 112 can disable the cell tower 110, preventing its use in the cellular network. Degradation of signals along the transmission pathway 112 may not disable the cell tower 110 but can reduce its operating efficiency, such as reducing Key Performance Indicators (KPIs) of the cell tower, or creating Quality of Service (QoS) issues. The KPIs are various metrics that are tracked to assess how efficiently or correctly the cell tower 110 is operating. The QoS are indications of how satisfied the users of the cellular network are with the cellular service. The reduction in a KPI or the creation of a QoS issue can adversely affect the operating efficiency of the cell tower 110 and the cellular network of which the cell tower 110 is a part. As such, faults 124 can have a significant impact on the cellular network and its users.

The cellular network connection 126 can be a fiber optic or other communication connection that links the transmission pathway 112 of the cell tower 110 to the rest of the cellular network. Communications between the UE and the cellular network are carried by the transmission pathway 112 to the cellular network through the cellular network connection 126.

Multiple monitoring devices, like monitoring device 210 and the base station 250 work together to monitor the transmission pathway 112 for faults 124. Each of the monitoring devices are electrically coupled to a portion of the transmission pathway 112 to collect data regarding the transmission pathway 112. The collected data is transmitted from the monitoring devices to the base station 250 where it is analyzed or evaluated to identify if a fault 124 is present in the transmission pathway 112. By using multiple monitoring devices located along the transmission pathway 112, the base station 250 receives data regarding the whole of the transmission pathway 112. This allows the base station 250 to identify a fault 124 anywhere along the transmission pathway 112 in a quick and efficient manner. Additionally, the base station 250 can analyze and evaluate the data from the monitoring devices to determine a location 254 and type 256 of a fault 124. By quickly and efficiently identifying the location 254 and type 256 of a fault 124, the cell tower monitoring and diagnostic system 100 performs the necessary fault 124 diagnosis that a technician would otherwise have to perform. This allows the technician to more efficiently repair or correct a fault 124, as they do not need to go through the process of removing and replacing portions of the transmission pathway 112 while attempting to repair a fault 124.

The monitoring device 210 is an example of one of the multiple monitoring devices that are located along the transmission pathway 112. The monitoring device 210 includes an identification 212, a signal module 214, an output 234, a communication module 236, and a power source 238. The monitoring device 210 is a small device that can be placed at locations along the transmission pathway 112 or can be integrated into portions of the transmission pathway 112. As mentioned, the monitoring device 210 is electrically coupled to a portion of the transmission pathway 112, such as at the antenna 114, cable 116, connector 118 or other equipment 120 of the transmission pathway 112. To gather data regarding the portion of the transmission pathway 112 to which the monitoring device 210 is coupled, the signal module 214 of the monitoring device 210 transmits an inquiry signal 216 along the portion of the transmission pathway 112 and receives a corresponding response signal 224 back from the portion of the transmission pathway 112. Features, characteristics and other information regarding the response signal 224 are output 234 by the monitoring device 210 and transmitted to the base station 250 by the communication module 238.

The identification 212 of the monitoring device 210 can be a series of numeric, alphanumeric or other characters that are unique the monitoring device 210. The identification 212 can assist with locating along which portion of the transmission pathway 112 the monitoring device 210 is coupled. The identification 212 of the monitoring device 210 can be permanent or it can be modifiable, such as programmable. The monitoring device 210 provides its identification 212 with the output 234 to the base station 250 to allow the base station 250 to identify the particular monitoring device 210 that provided the output 234. To determine a location of the monitoring device 210 along the transmission pathway 112, the base station 250 can maintain a record or database that correlates the identification 212 of the monitoring device 210 with a location along the transmission pathway 112. Alternatively, the identification 212 can include an indication of the location of the monitoring device 210 along the transmission pathway 112. For example, the transmission pathway 112 can be divided into a grid or portions and a structure or value of the identification 212 can include information regarding the grid or portion of the transmission pathway 112 at which the monitoring device 210 is located. Being able to determine a location of the monitoring device 210, such as by the identification 212 assists the base station 250 in identifying the location 254 of a fault 124.

The signal module 214 of the monitoring device 210 outputs the inquiry signal 216. The inquiry signal 216 has characteristics 218, such as an inquiry frequency 220, an inquiry energy 222, other characteristics or combinations thereof. The inquiry signal 216 is output as a pulse along the portion of the transmission pathway 112 to which the monitoring device 210 is coupled. The inquiry frequency 220 is the frequency of the inquiry signal 216, such as the frequency at which the inquiry signal 216 is output. In an example, the inquiry signal can be output at a low inquiry frequency 220, such as a frequency of 100 Hz to 500 Hz, which is a range in which there is no direct interference or harmonic interference with the frequency range used by the cell tower for radio transmission. Similarly, the inquiry energy 222 is the energy of the inquiry signal 214, such as the energy at which the inquiry signal is output. The inquiry frequency 220 and inquiry energy 222 of the inquiry signal 216 can be predetermined values that are known to the base station 250. For example, the base station 250 can be instructed or programmed that the inquiry frequency 220 and inquiry energy 222 are fixed values. Alternatively, the base station 250 can include a database that correlates the identification 212 of the monitoring device 210 with the predetermined values for the inquiry frequency 220 and inquiry energy 222. In another example, the output 234 can include an indication of the inquiry frequency 220 and inquiry energy 222, such as providing a value for each of the inquiry frequency 220 and the inquiry energy 222.

The inquiry signal 216 is output along the portion of the transmission pathway and reflects back along the portion of the transmission pathway 112. The reflection of the inquiry signal 112 can be received by the signal module 214 as the response signal 224. Alternatively, an inquiry signal from another monitoring device located on a neighboring portion of the transmission pathway 112 can be received by the signal module 214 as the response signal 224.

As the inquiry signal 216 transmits along the portion of the transmission pathway 112, the inquiry frequency 220 and inquiry energy 222 can be altered by various properties of the portion of the transmission pathway 112, such as by one or more material properties of the portion of the transmission pathway 112 or a fault 124 on the portion of the transmission pathway 112. The response signal 224 has a performance feature 226 that is indicative of the change caused by the transmission of the inquiry signal 216 along the portion of the transmission pathway. The performance feature can include a response frequency 228, a response energy 230, or a return time 232. The response frequency 228 can be the frequency of the response signal 224 received by the signal module 214 of the monitoring device 210. Alternatively, the response frequency 228 can be an amount of change between the inquiry frequency 220 and the frequency of the response signal 224. The amount of change between the inquiry frequency 220 and the frequency of the response signal 224 can be calculated or determined by signal module 214 and included in the output 234. Similarly, the response energy 230 can be a measure of the energy of the response signal 224 or an amount of change between the inquiry energy 222 and the energy of the response signal 224. The return time 232 is optional as is the elapsed time between outputting the inquiry signal 216 and receiving the response signal 224. The return time 232 can be calculated or timed by the signal module 214. In some cases, a fault 124 on the portion of the transmission pathway 112 can prevent the response signal 224 from being received by the signal module 214. For example, a fault 124 may prevent the reflection of the inquiry signal 216. If no response signal 224 is received after outputting the inquiry signal 216, the performance feature 224 of the response signal 224 can be the lack of one or more of response frequency 228, the response energy 230, or the return time 232.

The output 234 can include the performance feature 226 of the response signal 224, such as one or more of the response frequency 228, the response energy 230 or return time 232. As previously mentioned, the output 234 can also include the identification 212 of the monitoring device 210 or an indication of the inquiry frequency 220 and inquiry energy 222. The communication module 236 transmits the output 234 to the base station 250. In an example, the output 234 can be a 4 bit-8 bit data transmission that is sent by the communication module 236 to the bases station 250. Communication between the communication module 236 and the base station 250 can be through a wired or a wireless connection. The wired connection between the communication module 236 and the base station 250 can be through a local area network (LAN) or other wired communication protocol or connection. The wireless connection between the communication module 236 and the base station 250 can be a Wi-Fi, Bluetooth®, near-field communication, or other wireless communication protocol or connection. Additionally, the wireless connection can be through a mesh network that includes multiple, wirelessly interconnected monitoring devices similar to the monitoring device 210. In the mesh network, the output 234 can be transmitted from the monitoring device 210 to another monitoring device, and so on until the output 234 reaches the base station 250.

The power source 238 of the monitoring device 210 provides power for the various functions and features of the monitoring device 210, such as the signal module 214 and communication module 236. In an example, the power source 238 can be a battery or other energy storage device that provides electrical power to the various functions and features of the monitoring device 210. Alternatively, the power source 238 can be an external power to which the monitoring device 210 is coupled, such as an electrical power connection.

The base station 250 includes a fault detection module 252 and a communication module 258. The base station 250 can be positioned within the cell tower 110 to communicate with multiple monitoring devices that are located along the transmission pathway, such as the monitoring device 210. The base station 250 can be connected to an external power source or can include an internal power source, like a battery to provide electrical power for the various functions and features of the base station 250. In an embodiment, the base station 250 can be installed in the cell tower 110 as a stand-alone or separate device or system. Alternatively, the functions and features of the base station 250 can be integrated into a portion of the cell tower 110, such as a base bank of the cell tower 250.

The base station 250 receives the output 234 from the monitoring device 210 and the fault detection module 252 processes and analyzes the output 234. The output 234 is based on and can include the performance feature 226 of the response signal 224. The fault detection module 252 can analyze or evaluate output 234 to identify a fault 124 on the portion of the transmission pathway 112 associated with the monitoring device 210. In an embodiment, the fault detection module 252 can detect a fault 124 by comparing a value or characteristic of the output 234 to a threshold or range. If the value or characteristic of the output 234 is over or under the threshold, depending on the threshold, or outside of the range, then there is an indication that there is a fault 124 on the portion of the transmission pathway 112.

For example, it can be expected that the inquiry characteristics 218 of the inquiry signal 216 will decrease as the inquiry signal 216 transmits and reflects along the portion of the transmission pathway 112. The decrease of the inquiry characteristics 218 can be calculated or determined for the portion of the transmission pathway. In an example, the decrease of the inquiry characteristics 218 can be an amount of expected loss of the inquiry frequency 220 or inquiry energy 222. The expected loss can be a predetermined value and included in the fault detection module 252. The value of expected loss can also include a tolerance to account for real-world conditions that may cause the amount of expected loss to be slightly different. If the difference between the inquiry characteristic(s) 218 and the output 234 exceeds the value of the expected loss, then a fault 124 is identified on the portion of the transmission pathway 112. Similarly, the return time 232 of the response signal 224 can be an expected amount. The expected return time can be determined based on an average or other statistical metric of repeatedly receiving the response signal 224 from along the portion of the transmission pathway 112 or it can be a predetermined or calculated value associated with the portion of the transmission pathway 112. If the return time 232 is not within a range of the expected return time it can be an indication that there is a fault 124 on the portion of the pathway 112.

In another example, it can be expected that the output 234 will be within a predetermined range of values if there is not a fault 124 on the portion of the transmission pathway 112. To identify a fault 124, the fault detection module 250 can compare the value of the output 234 to the predetermined range of values. If the value of the output 234 is not within the predetermined range of value, then a fault 124 is identified on the portion of the transmission pathway 112.

The expected threshold or range of the value or characteristic of the output 234 can be based on the location of the monitoring device on the transmission pathway 112. For example, if the monitoring device 210 is placed on a cable 116 of the transmission pathway 112, the expected threshold or range of the value or characteristic of the output 234 can be a first threshold or range. If the monitoring device 210 is placed on a connector 118 of the transmission pathway 112, the expected threshold or range of the value or characteristic of the output 234 can be a second threshold or range. The fault detection module 252 can maintain or access a database that stores the various thresholds or ranges of the values or characteristics for the various portions of the transmission pathway 112. The fault detection module 252 can use the various thresholds or ranges of the values or characteristics when determining if a fault is present on the transmission pathway 112. For example, the fault detection module 252 can use the identification 212 of the monitoring device 210 to retrieve the appropriate threshold or range of the value or characteristic of the output 234 associated with the location of the monitoring device 210 along the transmission pathway 112. The fault detection module 252 can then compare the output 234 to the appropriate threshold or range of the value or characteristic and identify if a fault 124 is present on the portion of the transmission pathway 112.

The location 254 of a fault 124 can also be determined by the fault detection module 252. By knowing the location of the monitoring device 210, if the fault detection module 252 identifies that a fault 124 is present based on the output 234 from the monitoring device 210, then the fault detection module 252 can determine that the location 254 of a fault 124 is on the portion of the transmission pathway 112 at which the monitoring device 210 is located. The fault detection module 252 can also determine the location 254 of a fault 124 using information from multiple monitoring devices. By knowing the locations of the monitoring devices along the transmission pathway 112 and analyzing the output 234 from each of the monitoring devices, the fault detection module 252 can determine the location 254 of the fault 124 on the transmission pathway 112. For example, the fault detection module 252 can compare the outputs of a series of monitoring devices along the transmission pathway 112. If the output from one of the monitoring devices deviates from the output of the rest of the monitoring devices, then the fault detection module 252 can determine that the location 254 of the fault 124 is on the portion of the transmission pathway 112 associated with the one monitoring device. Similarly, the fault detection module 252 can also compare the output 234 from neighboring monitoring devices. If there is a deviation in the output 234 from each of the neighboring monitoring devices, then the fault detection module 252 can determine the location 254 of a fault 124 as being on the portion of the transmission pathway 112 between the two neighboring monitoring devices.

Additionally, the fault detection module 252 can provide a more detailed location 254 of a fault 124 on the transmission pathway 112. By analyzing or evaluating the output 234, the fault detection module 252 can determine a distance that a fault 124 is located from the monitoring device 210. In an embodiment, the output 234 can include the return time 232 that can be used to calculate a distance a fault 124 is from the monitoring device 210. For example, the fault detection module 252 can determine that a fault 124 is 12 ft from the monitoring device 210 based on the return time 232. The precise location 254 of a fault 124 can be provided to the network management center or a technician to allow them to more efficiently repair the fault.

The fault detection module 252 can also determine a type 256 of a fault 124. Similar to the location 254, the fault detection module 252 can analyze or evaluate a value or characteristic of the output 234 to determine the type 256 of a fault 124. The fault detection module 252 can have or access a record or database that correlates various the types 256 of faults 124 with a threshold or range of values or characteristics of the output 234. The types 256 of faults 124 and the associated output 234 thresholds, ranges or characteristics can be further correlated to specific portions of the transmission pathway 112 or the location of the monitoring device 210. In an example, a first type of fault 124 can be associated with a first threshold value of the output 234 and a second type of fault 124 can be associated with a second threshold value of the output 234. The fault detection module 252 can compare the output 234 from the monitoring device 210 with the first and second thresholds to determine which type of fault 124 is indicated by the output 234. Additionally, the fault detection module 252 can determine a type 256 of a fault 124 using the outputs 234 from multiple monitoring devices. For example, the fault detection module 252 can use the outputs 234 of neighboring monitoring devices to determine the type 256 of a fault 124.

The communication module 258 of the base station 250 allows the base station 250 to communicate 260 with the monitoring device(s) 210 and an external system or network 262. As discussed previously, the communication module 236 of the monitoring device 210 can communicate with the communication module 258 of the base station 250 using a communication protocol or connection, such as a Bluetooth® connection. Communication 260 with the monitoring device 210 can include receiving the output 234 from the monitoring device 210 and sending instructions to the monitoring device 210. The base station 250 can transmit instructions to the monitoring device 210 and cause it to perform one or more actions, such as output the inquiry signal 216 and provide the resulting output 234 back to the base station 250. In this manner, the base station 250 can instruct the monitoring device 210 to provide the output 234. The base station 250 can provide such instruction on a schedule or when instructed to, such as by the network management center. Additionally, by instructing the output 234 from the monitoring device 210, the base station can interrogate various portions of the transmission pathway 112 for faults 124, as needed.

The communication module 258 of the base station 250 can communicate with an external system or network 262 to provide information regarding identified faults 124 on the transmission pathway 112, such as the location 254 and type 256 of faults 124. Communication between the communication module 258 and the external system or network 262 can be through the cellular network connection 126 or another communication connection. The external system or network 262 can include a network management center or other network management system or location. The base station 250 can transmit a data message to the network management center using the communication module 258. The data message can include faults 124 identified on the transmission pathway 112 of the cell tower 110. The network management center can use this fault 124 information to schedule repairs or take other actions to correct the faults 124. Additionally, the network management center can communicate with the base station 250, such as to send instructions. For example, the network management center can monitor performance parameters of the cell tower 110, such as the KPIs. If the network management center notices that the KPIs are decreasing, the network management center can instruct the base station 250 to cause the monitoring device 210 generate the output 234 so that the base station 250 can identify if a fault 124 is present on the transmission pathway 112. In another example, the network management center can provide the base station 250 a schedule for the base station 250 to poll the monitoring devices of the cell tower 110 and determine if a fault 124 is present on the transmission pathway 112.

Figure 2:
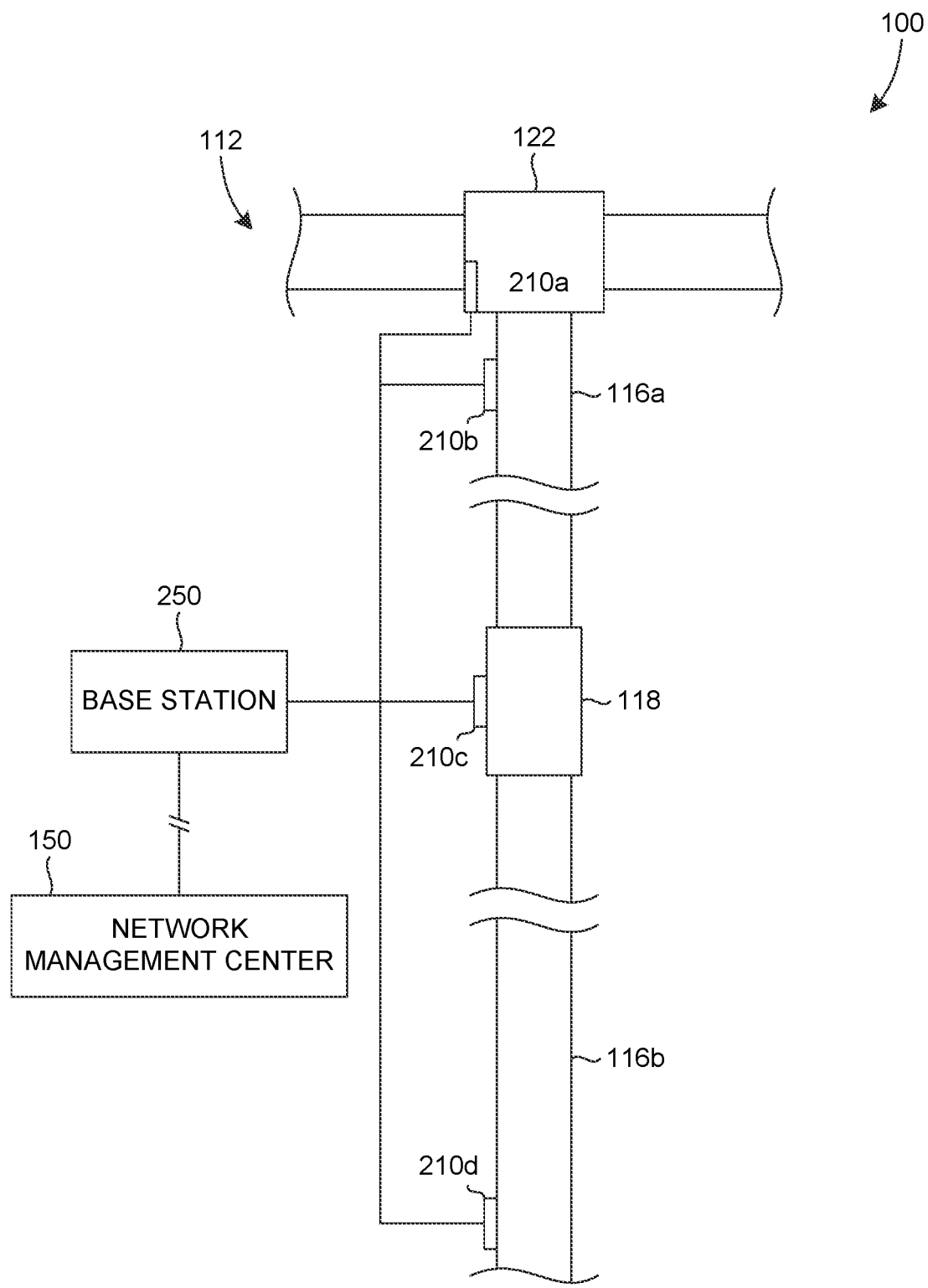
FIG. 2 is a further example of a cell tower monitoring and diagnostic system.

FIG. 2 illustrates an example cell tower monitoring and diagnostic system 200. The cell tower monitoring and diagnostic system 200 include multiple monitoring devices 210a-210d placed along the transmission pathway 112 of a cell tower. The monitoring devices 210a-210d communicate with the base station 250. The base station 250 analyzes or evaluates the outputs from the monitoring devices 210a-210d to identify faults on the transmission pathway 112. If a fault is identified, the base station 250 can send a message to the network management center 150 so that the fault can be repaired.

In the example of FIG. 2, a first monitoring device 210a is integrated with the switch 122 of the transmission pathway 112, a second monitoring device 210b is placed on a first cable 116a, a third monitoring device 210c is placed on the connector 118 and a fourth monitoring device 210d is placed on a second cable 116b. The monitoring devices 210a-210d output an inquiry signal along the portion of the transmission pathway 112 they are coupled to and receive a response signal that is either reflected back along their portion of the transmission pathway 112 or that is an inquiry signal from another one of the monitoring devices 210a-210d. For example, the response signal of the third monitoring device 210c can be a reflection of the inquiry signal the third monitoring device 210c outputs along the connector 118, or the response signal of the third monitoring device 210c can be the inquiry signal transmitted by the second 210b or fourth monitoring device 210c.

Each of the monitoring devices 210a-210d generates an output based on a performance feature of the response signal each monitoring device 210a-210d received. The monitoring devices 210a-210d then send the output to the base station 250. The base station 250 analyzes and evaluates the outputs from the monitoring devices 210a-210d to identify faults on the transmission pathway 112. The base station 250 also determines other details regarding the faults, such as the location and type of the faults. The resultant fault data can be transmitted from the base station 250 to the network management center 150.

Figure 3A:
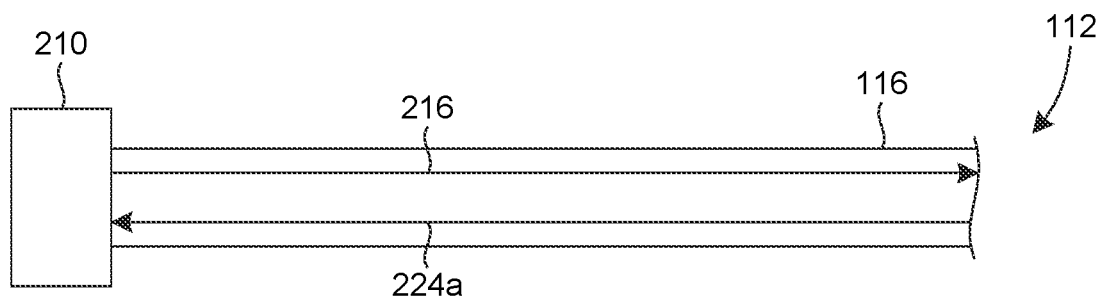
FIGS. 3A-3B are portions of an example cable of a transmission pathway.
Figure 3B:
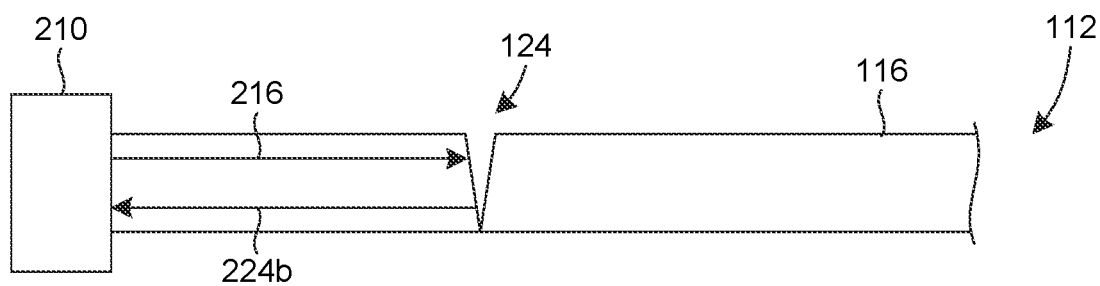

FIG. 3A illustrates an example cable 116 of the transmission pathway 112, and FIG. 3B illustrates the cable 116 with a fault 124. In the example of FIG. 3A, the cable 116 includes a monitoring device 210 electrically coupled to the cable 116. The monitoring device outputs an inquiry signal 216 along the cable 116 and receives a response signal 224a. The response signal 224a has the expected characteristics since the cable 116 of FIG. 3A does not include a fault 124. The response signal 224a can be substantially similar to the inquiry signal 216, with minor losses due to being transmitted along the cable 116.

In the example of FIG. 3B, the monitoring device 210 outputs the inquiry signal 216 along the cable 116. However, the cable 116 of FIG. 3B has a fault 124 that prevents the inquiry signal 116 from travelling further along the cable 116 of FIG. 3B. A response signal 224b reflects from the fault 124 and is received by the monitoring device 210. The response signal 224b does not have the expected characteristics since the inquiry signal 116 did not transmit along the cable 116 of FIG. 3B as expected due to the fault 124. In an example, the fault 124 can cause the response signal 224b to have greater losses, such as a lower energy than expected.

The monitoring device generates an output based on the performance feature of the response signal 224b. The output is transmitted by the monitoring device 210 to a base station that will identify the fault 124 on the cable 116 of FIG. 3B based on the output.

Figure 4:
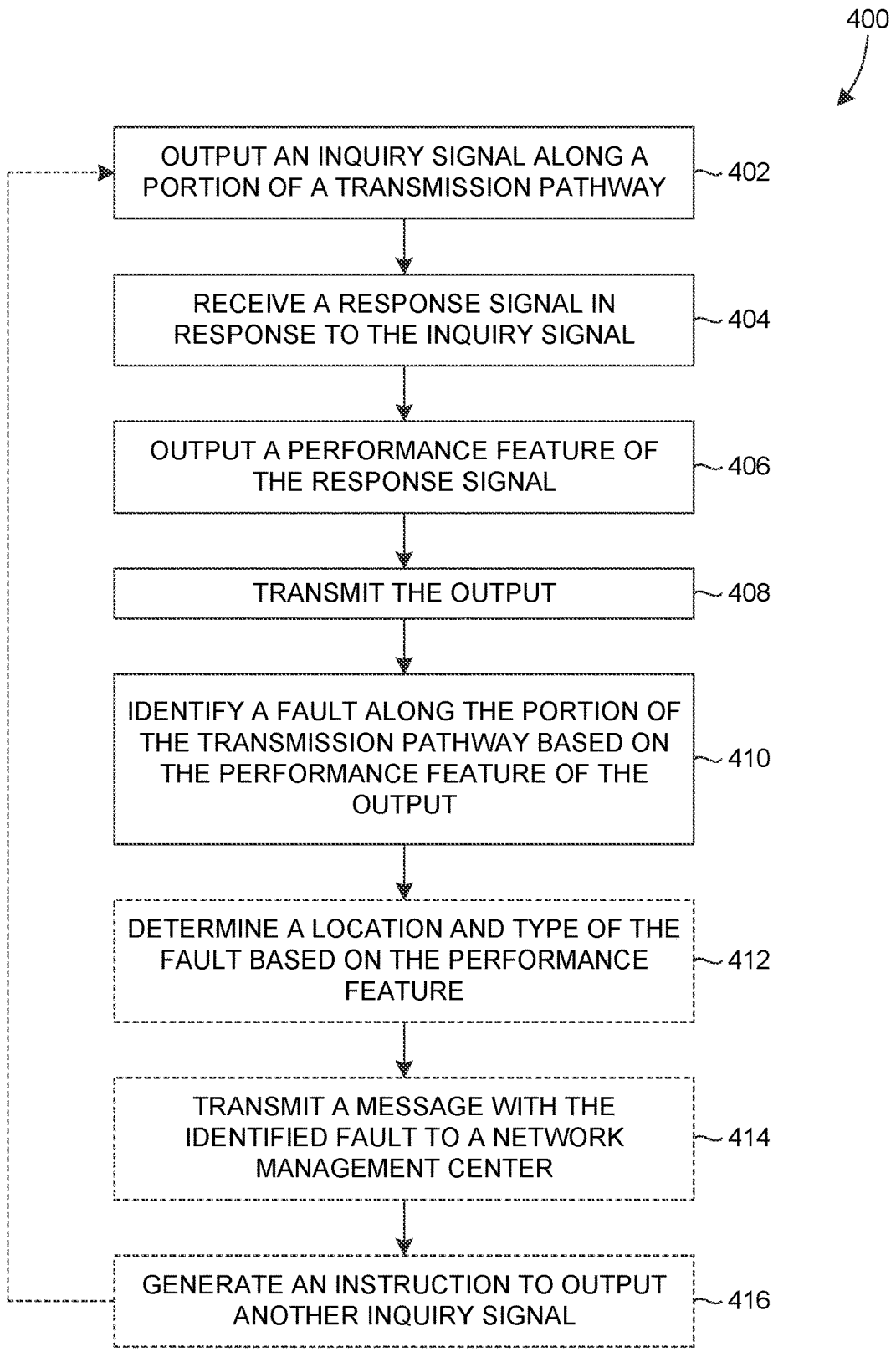
FIG. 4 is an example cell tower monitoring and diagnostic process.

FIG. 4 is an example cell tower monitoring and diagnostic process 400. At 402, an inquiry signal is output along a portion of the transmission pathway, such as by a monitoring device 210 of FIG. 1. As previously discussed, the inquiry signal has associated characteristics, like an inquiry frequency and an inquiry energy. At 404, a response signal is received in response to the inquiry signal, such as by the monitoring device 210. The response signal can be a reflection of the inquiry signal from the portion of the transmission pathway. The response signal has a performance feature, such as a response frequency, response energy and a return time. At 406, the performance feature of the response signal is output and at 408 the output is transmitted, such as by the monitoring device 210 to the base station 250 of FIG. 1.

At 410, a fault along the portion of the pathway is identified based on the performance feature of the output of 406. In an embodiment, the base station 250 can analyze or evaluate the performance feature to identify the fault. For example, the performance feature can be compared to the characteristics of the inquiry signal of 402 to identify if a fault is present along the portion of the transmission pathway. If the difference between the performance feature and the characteristics of the inquiry signal are outside of a threshold or range, the fault can be identified. At 412, optionally, a location and type of the fault of 410 can be determined based on the performance feature. Again, the performance feature can be analyzed and evaluated to determine the location of the fault on the transmission pathway and the type of fault. The location and type of the fault can help the technician efficiently and effectively repair the fault.

At 414, optionally, a message with the identified fault can be transmitted to a network management center, such as 150 of FIG. 2. The message can include that a fault has been identified and the location and type of the fault from 412. The network management center can use this message to schedule a repair of the fault or take other action, if necessary, to address the fault. Depending on the type of the fault, the network management center may be able to remotely implement a repair using software, such as altering an operating parameter of the cell tower to bypass or mitigate the fault.

At 416, optionally, an instruction to output another inquiry signal can be generated. The instruction can be generated by the base station 250 and provided to the monitoring device 210 to repeat the process 400. In some embodiments, the transmission pathway can be branched and repeating the process 400 can allow each branch of the transmission pathway to be checked for faults. Repeating the process 400 can also build up an operating history of the cell tower and the base station 250 can use this historical information to monitor for degradation of portions of the transmission pathway over time. For example, the base station 250 can perform trend analysis on the performance feature over time to see if the performance feature indicates that the portion of the transmission pathway is degrading. In this manner, the base station may be able to identify faults before they occur and allow preemptive repairs to be performed on the portion of the transmission pathway.

Figure 5:
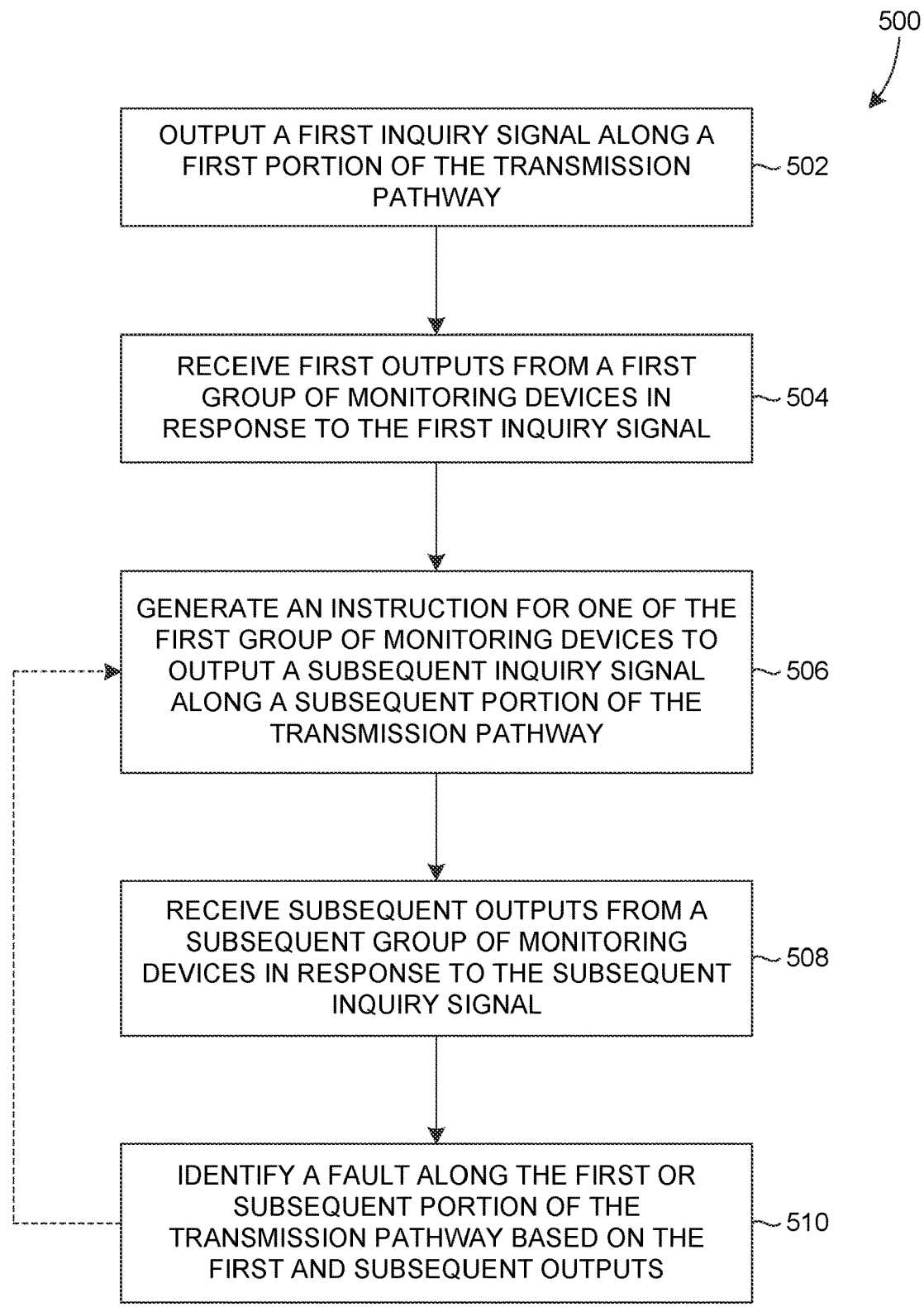
FIG. 5 is another example cell tower monitoring and diagnostic process.

FIG. 5 is another example cell tower monitoring and diagnostic process 500. At 502, a first inquiry signal is output along a first portion of the transmission pathway. The first inquiry signal can be output by a base station, such as 250 of FIG. 1 that is electrically coupled to the first portion of the transmission pathway. Alternatively, another device can be electrically coupled to the first portion of the transmission pathway and can output the first inquiry signal. For example, a monitoring device, such as 210 of FIG. 1 can be electrically coupled to the first portion transmission pathway and output the first inquiry signal. The first inquiry signal will travel along the first portion of the transmission pathway and will be received by one or more monitoring devices located along the first portion of the transmission pathway. The first portion of the transmission pathway is the portion of the transmission pathway along with the one or more monitoring devices that received the first inquiry signal. The one or more monitoring devices that receive the first inquiry signal are a first group of monitoring devices. The number of monitoring device that receive the first inquiry signal will depend on the characteristics of the first inquiry signal and whether a fault on the transmission pathway blocks the inquiry signal from transmitting further. For example, as the first inquiry signal transmits along the transmission pathway it will experience losses, such as decreasing energy. Eventually, these losses will prevent additional monitoring devices further along the transmission pathway from receiving the first inquiry signal. In another example, a fault along the transmission pathway can block the first inquiry signal from transmitting further along the transmission pathway or can cause additional losses that prevent the first inquiry from transmitting as far as expected along the transmission pathway.

At 504, first outputs from the first group of monitoring devices are received in response to the first inquiry signal. Each of the monitoring devices that receives the first inquiry signal, which include the first group of monitoring devices, generate and transmit a first output to the base station. The first outputs will be based on a performance feature of a response signal that each of the group of monitoring devices receives. In the process 500, the response signal received by each of the first group of monitoring devices is based on the first inquiry signal. Based on the received outputs, the base station can determine which monitoring device of the first group of monitoring devices is located the furthest along the transmission pathway, i.e. the last monitoring device that received the first inquiry signal.

At 506, an instruction for one of the first group of monitoring devices to output a subsequent inquiry signal along a subsequent portion of the transmission pathway can be generated. For example, the base station can generate and transmit an instruction to the last monitoring device that received the first inquiry signal. The instruction can cause the last monitoring device to output the subsequent inquiry signal along the transmission pathway. The subsequent portion of the transmission pathway is the portion of the transmission pathway immediately after the first portion. In this manner, the first inquiry signal is used to interrogate the first portion of the transmission pathway up to the point along the transmission pathway the first inquiry signal stops being received. The last monitoring device to receive the first inquiry signal can then output the subsequent inquiry signal to interrogate further along the transmission pathway, the subsequent portion of the transmission pathway. Rather than having each individual monitoring device along the transmission pathway output their own inquiry signal as described above, the inquiry signal is output as needed along portions of the transmission pathway. Doing this can reduce the energy expenditure of the individual monitoring devices and extend the operating life of the monitoring devices.

The subsequent inquiry signal transmits along the subsequent portion of the transmission pathway and is received by additional monitoring devices, a subsequent group of monitoring devices. The subsequent group of monitoring devices are the monitoring devices that receive the subsequent inquiry signal. Like the first inquiry signal, losses due to the transmission pathway or a fault limit how far along the transmission pathway the subsequent inquiry signal transmits. In some examples, the subsequent group of monitoring devices may not include any monitoring devices if there is a fault on the transmission pathway that prevents the subsequent inquiry signal from being received by any monitoring devices.

At 508, subsequent outputs from the subsequent group of monitoring devices are received in response to the subsequent inquiry signal. Similar to the first outputs, the subsequent outputs are based on a performance feature of the response signal received by each of the monitoring devices of the subsequent group of monitoring devices. Also similarly, the response signal received by each of the monitoring devices of the subsequent group is based on the subsequent inquiry signal. As previously mentioned, there may be no subsequent outputs if a fault on the subsequent portion of the transmission pathway prevents any monitoring devices from receiving the subsequent inquiry signal.

At 510, a fault along the first or subsequent portions of the transmission pathway can be identified based on the first and subsequent outputs. For example, the base station can analyze or evaluate the first and subsequent outputs to identify if a fault is present on the first portion or the subsequent portion of the transmission pathway. Additionally, the base station can evaluate the first and subsequent outputs to determine a location and type of a fault on the first or subsequent portions of the transmission pathway. As previously mentioned, there may be no subsequent outputs if a fault is immediately after the last monitoring device that sent one of the first responses. The base station can use the lack of subsequent responses to identify the fault and determine that the location of the fault is between the last monitoring device that sent one of the first responses and a subsequent monitoring device. If a fault is not identified, the process 500 can continue back at 506 to analyze further portions of the transmission pathway. This process can be repeated until the entire transmission pathway has been evaluated for faults.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

The invention claimed is:

1. A cell tower monitoring and diagnostic system having multiple monitoring devices that are each electronically coupled to a cell tower transmission pathway at various locations, the multiple monitoring devices including a first portion of monitoring devices located along a first portion of the transmission pathway and a second portion of monitoring devices located along a second portion of the transmission pathway, the multiple monitoring devices also electronically coupled to a base station that receives output from the multiple monitoring devices, the system comprising:
a processor configured to:
receive a data message from the base station, the data message including:
a first output from the first portion of monitoring devices, the first output including a first performance feature of the first portion of monitoring devices,
an indication of whether, based on the first output, a second inquiry was sent to the second portion of monitoring devices, and
based on the first output, an identity of a fault on the transmission pathway in one or both of the first portion or the second portion of monitoring devices;
use the message to request to dispatch a technician, the request generated in response to the identification of the fault in one or both of the first portion or the second portion of monitoring devices, the request including data relating to the identification of the fault in either or both of the first portion or the second portion, and
an output configured to output the request.

2. The system of claim 1, wherein the first performance feature of the first portion of monitoring devices is a response to a first inquiry signal sent along a first portion of the transmission pathway corresponding to the first portion of monitoring devices.

3. The system of claim 2, wherein the first inquiry signal is a low frequency pulse in the range of 100 Hertz (Hz) to 500 Hz.

4. The system of claim 1, wherein the first portion and the second portion of monitoring devices are positioned in series along the transmission pathway.

5. The system of claim 1, wherein the first portion and the second portion of monitoring devices are positioned in parallel along the transmission pathway.

6. The system of claim 1, wherein the first output includes a 4-bit to 8-bit data transmission from one monitoring device of the first portion of monitoring devices.

7. The system of claim 1, wherein the first performance feature includes one or both of a frequency of the first output and an energy of the first output.

8. The system of claim 1, wherein the data message further includes:

a second output from the second portion of the multiple monitoring devices, the second output including a second performance feature of the second portion of monitoring devices, the second output generated in response to a second inquiry transmitted to the second portion of monitoring devices, the second inquiry transmitted in response to the first output.

9. The system of claim 8, wherein the data message further includes an identity of the fault on the transmission pathway in the first portion of monitoring devices.

10. The system of claim 8, wherein the data message further includes an identity of the fault on the transmission pathway in the second portion of monitoring devices.

11. The system of claim 8, wherein the data message further includes an identity of the fault on the transmission pathway in the first portion and the second portion of monitoring devices.

12. The system of claim 8, wherein the request includes data relating to the identification of the fault in the first portion of monitoring devices.

13. The system of claim 8, wherein the request includes data relating to the identification of the fault in the second portion of monitoring devices.

14. The system of claim 8, wherein the request includes data relating to the identification of the fault in the first portion and the second portion of monitoring devices.

15. The system of claim 1, wherein the request to dispatch the technician includes one or both of a type or a location of the identified fault, the type or location based on the first performance feature.

16. The system of claim 1, wherein the first performance feature includes a return time to receive the first output from the first portion of monitoring devices in response to an inquiry signal.

17. The system of claim 1, wherein the first performance feature includes a difference between a frequency of an inquiry signal and a frequency of the first output.

18. The system of claim 1, wherein the first performance feature includes a difference between an energy of an inquiry signal and an energy of the first output.

19. The system of claim 1, wherein the data message includes an identification of a transmitting monitoring device in the first portion of multiple monitoring devices.

20. The system of claim 19, wherein the data message further includes a location of the fault along the transmission pathway that is based on the identified transmitting monitoring device.

* * * * *